(12) United States Patent
Nokob et al.

(10) Patent No.: US 12,087,276 B1
(45) Date of Patent: Sep. 10, 2024

(54) AUTOMATIC SPEECH RECOGNITION WORD ERROR RATE ESTIMATION APPLICATIONS, INCLUDING FOREIGN LANGUAGE DETECTION

(71) Applicant: Cisco Technology, Inc., San Jose, CA (US)

(72) Inventors: Mohamed Hariri Nokob, Mountain View, CA (US); Mohamed Gamal Mohamed Mahmoud, Santa Clara, CA (US); Ahmad Abdulkader, Palo Alto, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 364 days.

(21) Appl. No.: 17/155,825

(22) Filed: Jan. 22, 2021

(51) Int. Cl.
| | |
|---|---|
| *G10L 15/00* | (2013.01) |
| *G10L 15/01* | (2013.01) |
| *G10L 15/02* | (2006.01) |
| *G10L 15/22* | (2006.01) |
| *G10L 15/32* | (2013.01) |
| *G10L 25/78* | (2013.01) |

(52) U.S. Cl.
CPC ............ *G10L 15/005* (2013.01); *G10L 15/01* (2013.01); *G10L 15/02* (2013.01); *G10L 15/22* (2013.01); *G10L 15/32* (2013.01); *G10L 25/78* (2013.01)

(58) Field of Classification Search
CPC .............................. G10L 15/005; G10L 15/01
See application file for complete search history.

(56) References Cited

U.S. PATENT DOCUMENTS

| | | | | |
|---|---|---|---|---|
| 10,573,312 | B1* | 2/2020 | Thomson | G10L 15/22 |
| 10,726,834 | B1 | 7/2020 | Shellef et al. | |
| 2013/0238336 | A1* | 9/2013 | Sung | G10L 15/32 |
| | | | | 704/255 |
| 2015/0364129 | A1* | 12/2015 | Gonzalez-Dominguez | |
| | | | | G10L 15/005 |
| | | | | 704/251 |
| 2017/0011734 | A1* | 1/2017 | Ganapathy | G10L 15/005 |
| 2018/0068651 | A1 | 3/2018 | Sidi et al. | |
| 2018/0342239 | A1* | 11/2018 | Baughman | G10L 15/005 |
| 2018/0374476 | A1* | 12/2018 | Lee | G10L 15/22 |
| 2019/0244611 | A1 | 8/2019 | Godambe et al. | |
| 2019/0371335 | A1 | 12/2019 | Shastry et al. | |
| 2020/0043483 | A1 | 2/2020 | Prabhavalkar et al. | |
| 2020/0380215 | A1* | 12/2020 | Kannan | G06N 3/045 |
| 2021/0142805 | A1* | 5/2021 | Shastry | G10L 15/22 |

OTHER PUBLICATIONS

Qinyi Wang et al., "Code-Switching Detection Using ASR-Generated Language Posteriors", Interspeech 2019, Sep. 15-19, 2019, 5 pages.

(Continued)

*Primary Examiner* — Shaun Roberts
(74) *Attorney, Agent, or Firm* — Edell, Shapiro & Finnan, LLC

(57) ABSTRACT

A plurality of audio datasets associated with captured audio are provided to a plurality of automatic speech recognition engines, wherein each of the automatic speech recognition engines is configured to recognize speech of a first language. Word error rate estimates that comprise at least one word error rate estimate for each of the plurality of audio datasets are determined from outputs of the plurality of automatic speech recognition engines. From the word error rate estimates, audio in the plurality of audio datasets is determined to include speech in a second language.

20 Claims, 10 Drawing Sheets

(56) References Cited

OTHER PUBLICATIONS

Christian Bartz et al., "Language Identification Using Deep Convolutional Recurrent Neural Networks", arXiv:1708.04811v1 [cs.CV], Aug. 16, 2017, 10 pages.
Randall Fish et al., "Using Audio Quality to Predict Word Error Rate in an Automatic Speech Recognition System", Mitre Corp Bedford MA Bedford United States, Jan. 1, 2003, 4 pages.
Savitha Murthy et al., "Effect of TTS Generated Audio on OOV Detection and Word Error Rate in ASR for Low-resource Languages", Interspeech, Sep. 2018, 5 pages.
Matteo Negri et al., "Quality Estimation for Automatic Speech Recognition", Proceedings of COLING 2014, the 25th International Conference on Computational Linguistics: Technical Papers, Aug. 23-29, 2014, 11 pages.
Ahmed Ali et al., "Word Error Rate Estimation Without ASR Output: e-WER2", arXiv:2008.03403v1 [eess.AS], Aug. 8, 2020, 5 pages.
Yik-Cheung Tam et al., "ASR Error Detection Using Recurrent Neural Network Language Model and Complementary ASR", 2014 IEEE International Conference on Acoustic, Speech and Signal Processing (ICASSP), May 4, 2014, 5 pages.
Shahab Jalalvand et al., "TranscRater: a Tool for Automatic Speech Recognition Quality Estimation", Proceedings of the 54th Annual Meeting of the Association for Computational Linguistics-System Demonstrations, Aug. 7-12, 2016, 6 pages.
Ahmed Ali et al., "Word Error Rate Estimation for Speech Recognition: e-WER", Proceedings of the 56th Annual Meeting of the Association for Computational Linguistics (Short Papers), Jul. 15-20, 2018, 5 pages.

\* cited by examiner

AUTOMATIC SPEECH RECOGNITION WORD ERROR RATE ESTIMATION APPLICATIONS, INCLUDING FOREIGN LANGUAGE DETECTION

TECHNICAL FIELD

The present disclosure relates to automatic speech recognition, and in particular, to providing word error rate estimates and foreign language detection in conjunction with automatic speech recognition systems.

BACKGROUND

It may be desirable to estimate the word error rate of an automatic speech recognition generated transcript in order to filter out low quality transcripts or to notify the user of the quality of the transcription. However, a ground truth in the form of a human-generated transcript is rarely available to compare to the transcript output by an automatic speech recognition engine. Having a way of a determining a word error rate estimate without relying on a human transcription may be desirable.

Automatic speech recognition engines may be configured to recognize speech in audio data for a particular language. Attempting to recognize speech of a language other than the particular language of the automatic speech recognition engine may result in the automatic speech recognition engine providing a transcript with a very high word error rate. It may be desirable to provide for automatic detection of foreign languages in audio data so that appropriate automatic speech recognition engines may be selected without user intervention.

DESCRIPTION OF EXAMPLE EMBODIMENTS

Overview

According to example embodiments, the present disclosure relates to automatic speech recognition word error rate estimation applications. According to a first example embodiment, word error rate estimation techniques are leveraged to provide foreign language detection. A plurality of audio datasets associated with captured audio are provided to a plurality of automatic speech recognition engines, wherein each of the automatic speech recognition engines is configured to recognize speech of a first language. Word error rate estimates that comprise at least one word error rate estimate for each of the plurality of audio datasets are determined from outputs of the plurality of automatic speech recognition engines. From the word error rate estimates, audio in the plurality of audio datasets is determined to include speech in a second language.

According to a second example embodiment, word error rate estimation techniques are leveraged for word error rate estimates in ensemble automatic speech recognition systems. An audio dataset associated with captured audio is provided to a first automatic speech recognition engine. The audio dataset is also provided to a second automatic speech recognition engine. One or more audio features are extracted from differences between an output of the first automatic speech recognition engine and an output of the second automatic speech recognition engine. The one or more audio features are provided to a word error rate estimation model, wherein the word error rate estimation model was trained using the first automatic speech recognition engine and the second automatic speech recognition engine. Finally, a word error rate estimate is obtained from the word error rate estimation model

Example Embodiments

Figure 1:
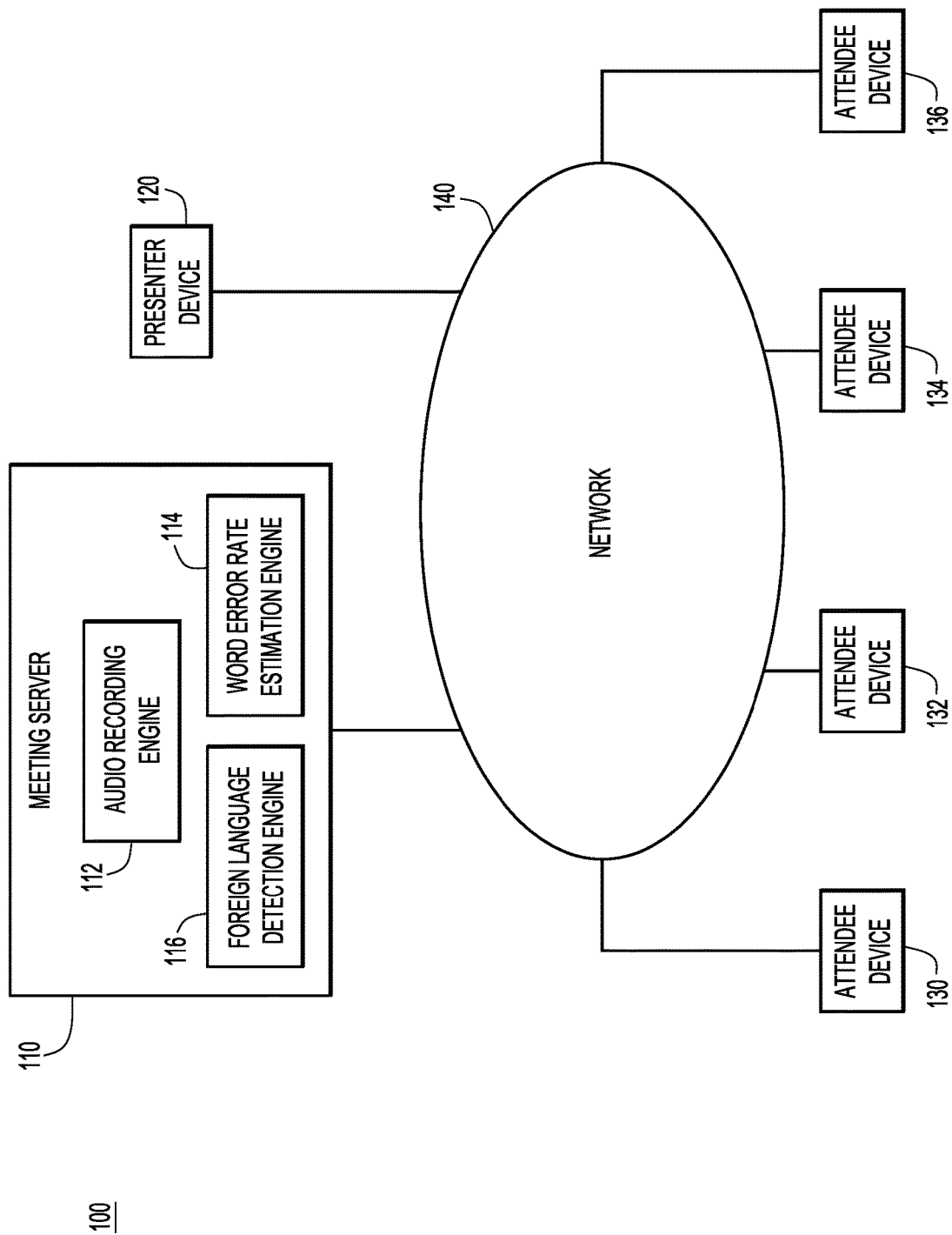
FIG. 1 illustrates a network environment in which a computing entity may be configured to implement the automatic speech recognition word error rate estimation techniques of the present disclosure, according to an example embodiment.

Referring to FIG. 1, an online meeting or conference system 100 is shown that enables a meeting server 110 to facilitate an online conference session (e.g., a web-based meeting) in which users can share voice, video, chat, and/or other types of data communication through presenter device 120 and attendee devices 130, 132, 134, and 136 over network 140. The online conference session may further involve desktop sharing and/or application sharing. Only four attendee devices are shown in FIG. 1, but any number of attendee devices may be included in system 100. Additionally, the presenter device 120 and attendee devices 130, 132, 134, and 136 may have the same capabilities in the online conference session, with the exception that the presenter device 120 is designated, during some period of time, to share content with the attendee devices in the online conference session. The designation of "presenter device" may change throughout the online conference session, and is used herein merely to specify which of the participant devices is currently sharing content. In general, presenter device 120 and attendee devices 130, 132, 134, and 136 may take a variety of forms, including a desktop computer, laptop computer, mobile/cellular phone (e.g., Smartphone), a tablet computer, an Internet telephone, etc. Network 140 may be any type of network (e.g., any combination of Internet, intranet, local area network (LAN), wide area network (WAN), wired network, wireless network, etc.) that connects computing devices, e.g., presenter device 120 and attendee devices 130, 132, 134, and 136. It should be understood that in a web-based conference system, each device may communicate with the server 110 through a browser application having one or more plug-ins that enable the web-based meeting experience, and allow for the transmission of data to the meeting server 110, and the reception of data from the meeting server during a conference/meeting session. According to the specific example embodiment of FIG. 1, meeting server 110 is illustrated as a standalone server. According to other example embodiments, the functionality that is described with reference to meeting server 110 may be implemented through a cloud-based online conference service.

Included in meeting server 110 are audio recording engine 112, word error rate estimation engine 114 and foreign language detection engine 116. These software and/or hardware implemented processes are configured to provide a verification that the language detected for a particular meeting or conference is indeed the true language of the meeting. According to the techniques presented herein, audio recording engine 112 provides an audio dataset, such as from an online conference session. This audio dataset is provided to word error rate estimation engine 114, which in turn provides word error rate estimates for the audio dataset. Language detection engine 116 makes a determination regarding the language used in the audio dataset based upon the word error rate estimates. If the language in the audio dataset is determined to be different than the language configured to be detected in the automatic speech recognitions engines of word error rate estimation engine 114, the audio may then be passed to different automatic speech recognition engines that are configured to recognize speech in the next best prediction of the language contained in the recorded audio. This process may be repeated until foreign language detection engine 116 determines that the language contained in the audio dataset and the language used in the automatic speech recognition engines are the same.

According to specific example embodiments, word error rate estimates are generated for multiple automatic speech recognition engine transcripts of audio data, such as the audio recorded during an online conference. Specifically, audio recording engine 112, word error rate estimation engine 114 and foreign language detection engine 116 operate together to verify that the language spoken in the audio dataset is the same as the language that is utilized by the automatic speech recognition engines. Such a system may be beneficial for audio data where the recorded language is not known in advance.

As described in greater detail below, audio recording engine 112 is configured to record the audio associated with one or more online conference sessions hosted by meeting server 110. Audio recording engine 112 may be embodied as an audio/video recording engine that records audio, screen shares, and other audio/visual data transmitted between presenter device 120 and attendee devices 130, 132, 134, and 136. Audio recording engine 112 may generate one or more audio datasets, which may be provided to word error rate estimation engine 114. Word error rate estimation engine 114 may be configured to generate word error rate estimates for transcripts generated from automatic speech recognition engines, which may be included in word error rate estimation engine 114 as described in greater detail below. According to specific example embodiments, the automatic speech recognition engines of word error rate estimation engine 114 may be configured to recognize speech in a first language. Outputs from word error rate estimation engine 114 may then be provided to foreign language detection engine 116. Foreign language detection engine 116 contains a statistical model (sometimes referred to herein as a foreign language detector model) configured to detect foreign languages based upon received word error rate estimates. Accordingly, foreign language detection engine 116 is configured to determine if the audio datasets provided to word error rate estimation engine 114 contain audio in speech that is in a language that is different from the language that the automatic speech recognition engines are configured to recognize.

In summary, the techniques presented herein may implement the following features in order to make determinations regarding the languages used in the speech audio.

First, an audio recording, such as the audio associated with an online conference, is acquired and divided into smaller parts (sometimes referred to herein as "shards") by audio recording engine 112. The division of an audio recording into separate shards may be based on voice activity detection. Accordingly, the individual shards will contain the portions of the online conference during which someone was speaking. Times during the conference where no speech is recorded may not be included in the shards.

Second, each shard is passed through the word error rate estimation engine 114. Word error rate estimation engine 114 transcribes each shard using multiple automatic speech recognition engines. Word error rate estimation engine 114 then evaluates the transcripts provided by the automatic speech recognition engines, providing word error rate estimates for the transcripts for each of the shards.

Third, after word error rate engine 114 generates the word error rate estimates for the shards, foreign language detection engine 116 determines from the word error rate estimates if the assumed language for the online conference (i.e., the language used by the automatic speech recognition engines of word error rate estimation engine 114) matches the actual language spoken in the shards. This foreign language detection process involves extracting statistical metrics (i.e., feature extraction) from the word error rate estimates and then passing those metrics as features to a foreign language detector model for inference of the validity of language used in the transcription of the audio shards.

Foreign language detection engine 116 may operate on the principle that the statistical distribution of the word error rate estimates for meetings with poor audio recordings differ from those of foreign language meetings. These differences in the statistical distributions may be categorized using machine learning methods, which allow a model to be trained to recognize a an audio transcription that was transcribed using an automatic speech recognition engine configured to detect a language that differs from the language spoken in the audio data. Accordingly, the techniques of the present disclosure include the training of a foreign language detector model that is used by foreign language detection engine 116 to recognize automatic speech recognition transcripts that have been transcribed by automatic speech recognitions engines configured to recognize speech in a language that differs from the language actually used in the audio data being transcribed. The machine learning methods presented herein may train a foreign language detector model using labelled data or by clustering of unlabeled data.

In order to train and use a foreign language detector model, statistical metrics are extracted from word error rate estimates generated for the audio data being evaluated. For example, the statistical metrics extracted according to the techniques of the present disclosure may include the following word error rate estimate statistical metrics.

A Percentage of Valid Word Error Rate Estimates—The percentage of valid word error rate estimates to the total number of word error rate estimates may be used to train or use a foreign language detector model, according to the techniques of the present disclosure. A word error rate estimator may sometimes be unable to return a word error rate estimate for a transcript because, for example, one or more of the automatic speech recognition engines did not return a transcript or because the transcripts that are returned are empty (which may happen when the audio provided to the automatic speech recognition engine is silent or otherwise untranscribable by the automatic speech recognition engine). In such cases, the word error rate estimator may provide an indication of an invalid word error rate estimate. The techniques of the present disclosure may extract this percentage of invalid estimates compared to the total number of word error rate estimates in order to both train and use a foreign language detector model.

A Percentage of Word Error Rate Estimates that Deviate from a Predetermined Threshold—The percentages of word error rate estimates that deviate from a predetermined threshold may also be used to train or use a foreign language detector model, according to the techniques of the present disclosure. Word error rates and/or word error rate estimates are often provided as a percentage of errors to the total number of words in the audio for which the word error rate or word error rate estimate is provided. For example, a word error rate or word error rate estimate WER may be calculated according to the following formula:

$$WER = \frac{S+D+I}{S+D+C};$$

where S is the number of substitutions, D is the number of deletions, I is the number of insertions, and C is the number of correct words in the reference, with the sum of S, D and C providing the total number of words in the audio. The percentage of word error rates or word error rate estimates that that deviate from a predetermined threshold (i.e., that are above or below a predetermined percentage) may be extracted and used in the training and/or use of a foreign language detector model, according to the techniques of the present disclosure. Word error rate values may typically vary between 0% and 70%, therefore, the predetermined threshold value may be 40%, 30%, 20% and the like.

The Level of One or More Moments Around a Mean Word Error Rates Estimate Value—The different levels of one or more of the moments around the mean of a set of word error rate estimates may also be used to train or use a foreign language detector model, according to the techniques of the present disclosure. For a set of word error rates or word error rate estimates $X_1, X_2, X_3, \ldots, X_N$, the kth moment about the mean mx is calculated according to the following formula:

$$m_k = \frac{\sum_{j=1}^{N}(X_j - \overline{X})^k}{N};$$

where $\overline{X}$ is the arithmetic mean for the N word error rate estimates. An example of such a moment about the mean would be the second moment about the mean, known as the variance, the square of the standard deviation of the word error rate estimates. One or more of these moments about the mean word error rate estimate for a set of word error rate estimates may be used in the foreign language detector model training and/or usage techniques of the present disclosure.

Duration and Word Count Weighted Means of a Set of Word Error Rate Estimates—The duration and word count weighted means for a set of word count error rate estimates may be used to train or use a foreign language detector model, according to the techniques of the present disclosure. For example, the weighted mean for a set of word error rates or word error rate estimates $X_1, X_2, X_3, \ldots, X_N$ with respective weights $W_1, W_2, W_3, \ldots W_N$, would be given by:

$$\frac{X_1 * W_1 + X_2 * W_2 + X_3 * W_3 + \ldots + X_n * W_n}{W_1 + W_2 + W_3 + \ldots + W_n}.$$

For duration weighted means, the weight Wn would represent the duration of the audio for which the word error rate was calculated. For word count weighted means, Wn would represent the word count of the audio for which the word error rate was calculated. Such weighted means may be used in the foreign language detector model training and/or usage techniques of the present disclosure.

Using word error rate estimates to provide foreign language detection may be beneficial as compared to other techniques of foreign language detection. For example, the automatic speech recognition transcripts and word error rate estimates that are used in the techniques presented herein may be available without incurring additional operational costs. Specifically, automatic speech recognition transcripts and word error rate estimates for automatic speech recognition systems may already be generated in existing online conference systems. The foreign language detection techniques presented herein may leverage these pre-existing transcripts and word error rate estimates as an additive feature. The techniques of the present disclosure may also be beneficial in that they allow an automatic speech recognition system to take remedial action. When word error rate estimates are collected for a full meeting made of multiple shards, different patterns emerge for different types of meetings. In particular, by passing the statistical features extracted from the multiple word error rate estimates to a statistical model trained as described herein, it is possible to separate online meeting audio into two different groups— one group in which the automatic speech recognition was applied using engines configured for the language spoken in the shards, and one group in which the automatic speech recognition was applied using engines configured for a language other than the language spoken in the shards. Remedial action may be taken for this second group, such as sending the audio shards for transcription via alternative automatic speech recognition engines which are configured to transcribe the language actually spoke in these shards.

Figure 2:
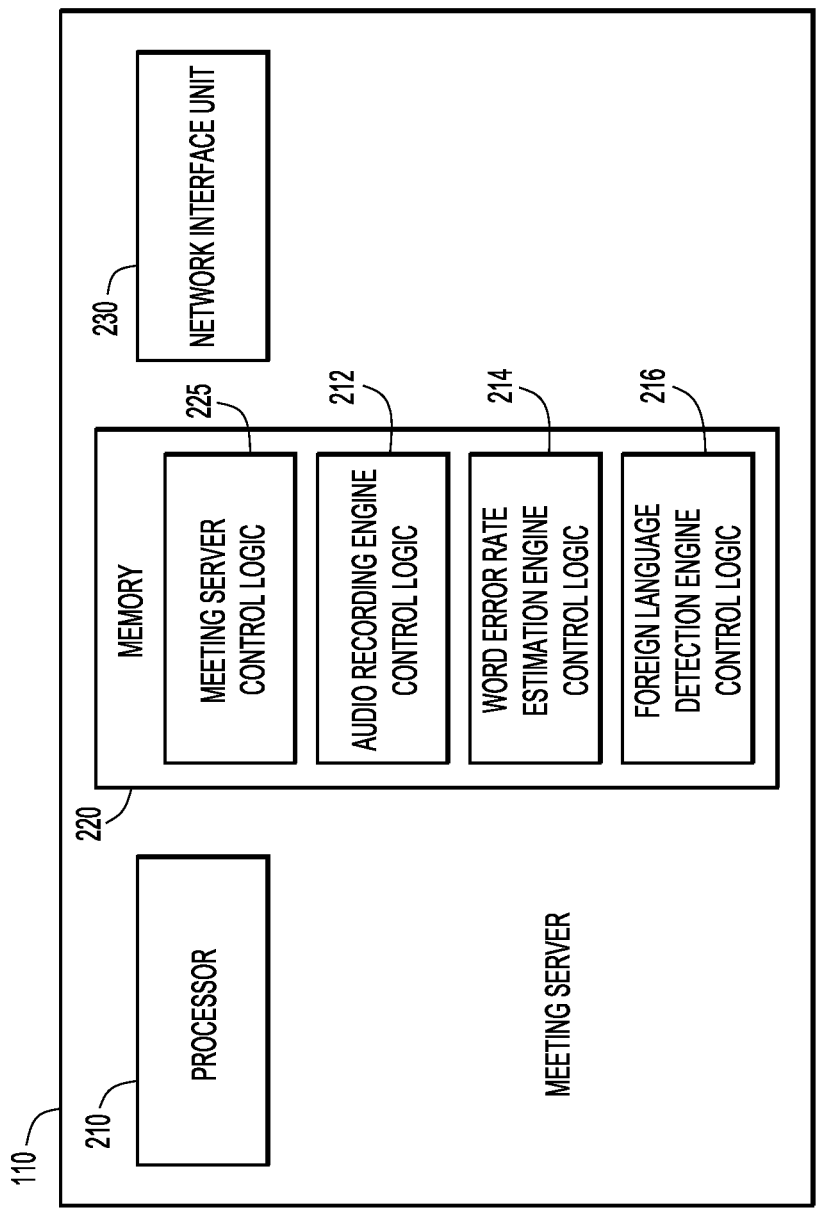
FIG. 2 is a functional block diagram of a meeting server configured implement the automatic speech recognition word error rate estimation techniques of the present disclosure, according to an example embodiment.

Referring now to FIG. 2, a simplified block diagram of meeting server 110 is shown. Server 110 includes a processor 210 to process instructions relevant to an online conference session supported by the system 100, memory 220 to store a variety of data, including audio datasets associated with online conference sessions, and software instructions (e.g., audio, video, control data, etc.), including audio recording engine control logic 212, word error rate estimation engine control logic 214 and foreign language detection engine control logic 216. The meeting server 110 also includes a network interface unit (e.g., one or more network interface cards) 230 that enables network communications so that the server 110 can communicate with other devices, e.g., the presenter and attendee devices. Memory 220 may comprise read only memory (ROM), random access memory (RAM), magnetic disk storage media devices, optical storage media devices, flash memory devices, electrical, optical, or other physical/tangible (e.g., non-transitory) memory storage devices. The processor 210 is, for example, a microprocessor or microcontroller that executes instructions for implementing the processes described herein. Thus, in general, the memory 220 may comprise one or more tangible (non-transitory) computer readable storage media (e.g., a memory device) encoded with software (e.g., the meeting server control logic/software 225, the audio recording engine control logic 212, the word error rate estimation engine control logic 214 and the foreign language detection engine control logic 216) comprising computer executable instructions and when the software is executed (by the processor 210) it is operable to perform the operations described herein.

Figure 3:
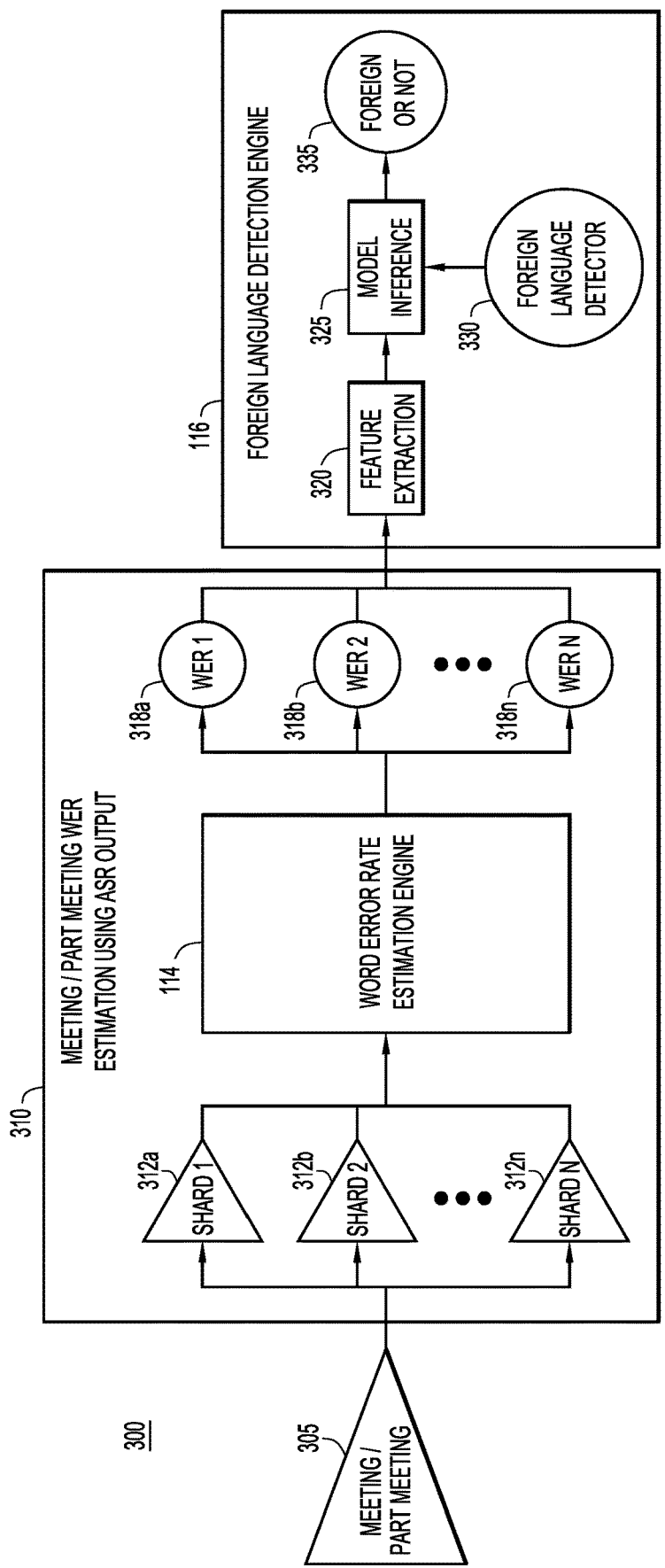
FIG. 3 is a process flow diagram depicting foreign language detection using the word error rate estimation techniques of the present disclosure, according to an example embodiment.

With reference now made to FIG. 3, depicted therein is a process flow diagram illustrating a process flow 300 between word error rate estimation engine 114 and foreign language detection engine 116, according to an example embodiment. As shown in FIG. 3, captured audio 305 is provided to word error rate estimation process 310 as a plurality of audio datasets 312a-n (i.e., audio shards). Captured audio 305 may be recorded as part of an online conference, and recorded using an audio recording engine, such as audio recording engine 112 of FIG. 1, or recorded using audio recording logic, such as audio recording logic 212 of FIG. 2. Similarly, the separation of captured audio 305 into audio datasets 312a-n may be performed by an audio recording engine, such as audio recording engine 112 of FIG. 1, or using audio recording logic, such as audio recording logic 212 of FIG. 2. Each of audio datasets 312a-n is provided to word error rate estimation engine 114, which outputs at least one word error rate estimate 318a-n for each of audio datasets 312a-n. The details of the process flow of word error rate estimation engine 114 are described below with reference to FIG. 5.

Word error rate estimation engine 114 provides word error rate estimates 318a-n to foreign language detection engine 116. The process implemented by foreign language detection engine 116 begins with the extraction of features from word error rate estimates 318a-n by feature extraction function 320. The feature extraction function 320 extracts features that may include the percentage of word error rate estimates 318a-n that are deemed to be valid or have a relatively low word error rate, the percentage of word error rate estimates 318a-n that deviate from a predetermined threshold, differing levels of moments around the mean word error rate estimate value, and/or weighted means of word error rate estimates 318a-n, such as duration and word count weighted means, as described in greater detail above.

The features extracted by feature extraction function 320 are then provided to model inference operation 325. As used herein, the operations provided by model inference operation 325 transform the features extracted by feature extraction function 320 into a format in which they may be run against foreign language detector model 330 which results in a determination 335. Determination 335 indicates whether or not a foreign language (i.e., a language different than the language assumed to be present in captured audio 305 by automatic speech recognition engines utilized by word error rate estimation engine 114) is present in the captured audio 305.

The above-described process may be used to determine if the language used throughout the entirety of captured audio 305 was the same language assumed by the automatic speech recognition engines in word error rate estimation process 310, as well as if the language being used switches at some point within captured audio 305. Process flow 300 may be used after an online conference completes (i.e., captured audio 305 represents the audio for the entire online conference), or process flow 300 may begin prior to the end of an online conference or other audio capture operation, so long as captured audio 305 includes a sufficient number of audio datasets 312a-n (i.e., shards). If it is determined prior to the conclusion of an online conference or other audio capture operation that the language being spoken is not the language assumed by the automatic speech recognition engines, a decision may be made to select different automatic speech recognition engines that operate to recognize the correct language being spoken during the online conference or other audio capture operation.

Figure 4:
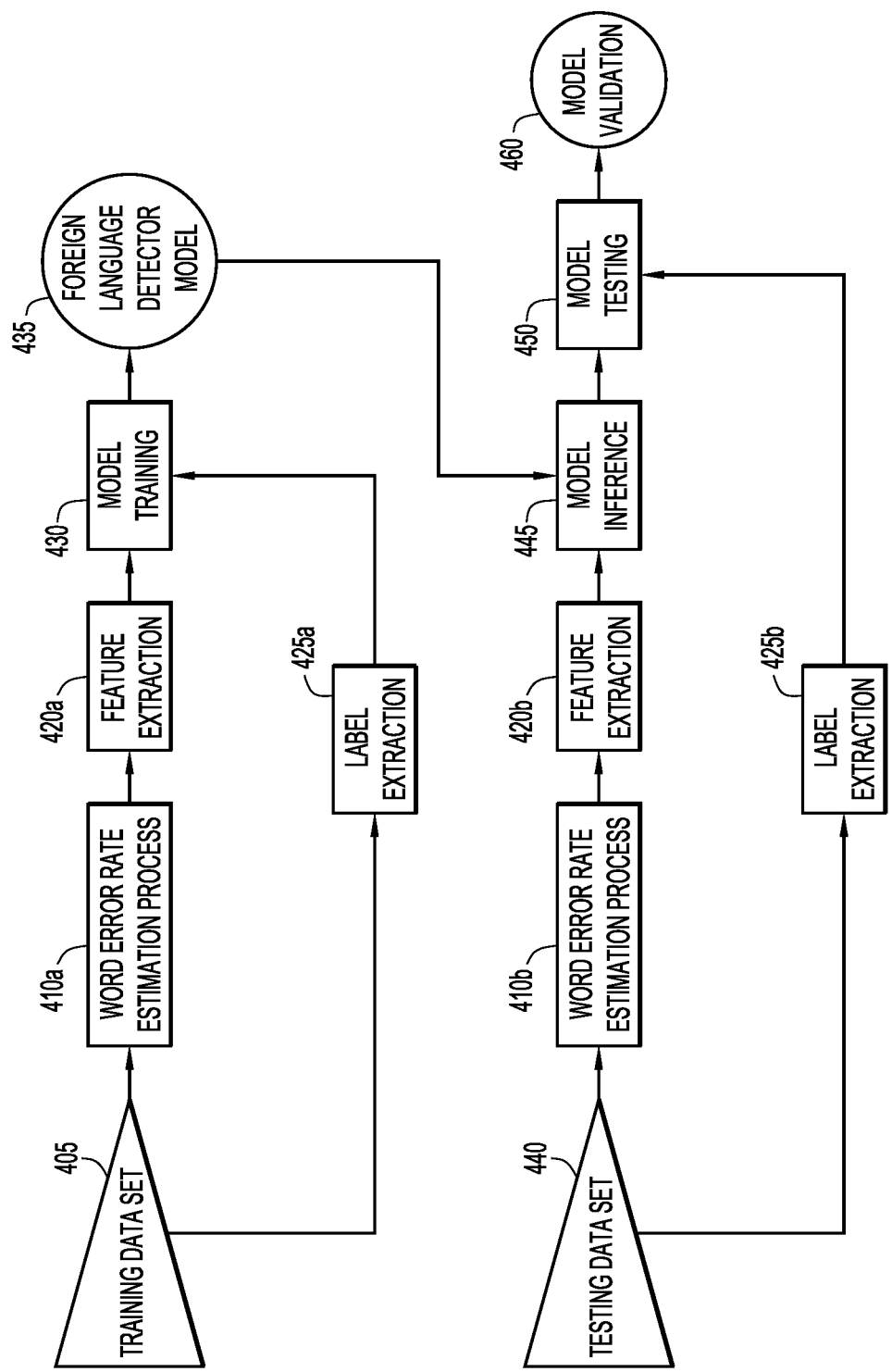
FIG. 4 is a process flow diagram depicting a process for training and validating a model to implement foreign language detection using the word error rate estimation techniques of the present disclosure, according to an example embodiment.

With reference now made to FIG. 4 depicted therein is a process flow 400 configured to train and validate a model that may be used to detect a foreign language recording using word error rate estimates, such as foreign language detector model 330 of FIG. 3. Specifically, process flow 400 implements a supervised training process to train foreign language detector model 435, though the skilled artisan may understand that an unsupervised training process may be used in accordance with the techniques presented herein. For supervised training methods, a statistical model of any kind may be trained to detect foreign languages using labeled data (e.g., audio recordings whose language is known). In unsupervised models, principal component analysis or clustering techniques may be used to give good predictions about the language contained in audio data without the need for labelled data during training.

Process flow 400 begins when a training audio dataset 405 is provided to word error rate estimation process 410a. The operations provided by word error rate estimation process 410a may be analogous to word error rate estimation process 310 of FIG. 3, and therefore, the processing of the training audio dataset 405 will proceed in an analogous manner to how word error rate estimation process 310 of FIG. 3 processes captured audio 305. The results of word error rate estimation process 410a, which may be a plurality of word error rate estimates analogous to word error rate estimates 318a-n of FIG. 3, are provided to feature extraction function 420a, which is analogous to feature extraction function 320 of FIG. 3.

Training audio dataset 405 is also provided to label extraction function 425a. Label extraction function 425a generates label data used in model training operation 430 for foreign language detector model 435. According to one example embodiment, the output of label extraction function 425a is an indication of whether or not the language spoken in training audio dataset 405 is the same language used by the automatic speech recognition engines contained within word error rate estimation process 410a.

The outputs of feature extraction function 420a and label extraction function 425a are then provided to model training operation 430, during which foreign language detector model 435 (which is analogous to foreign language detector model 330 of FIG. 3) is trained. The above-described process may be repeated for a number of training audio datasets 405 to ensure that foreign language detector model 435 may identify datasets as having the same or a different language from the language assumed by the automatic speech recognition engines contained in word error rate estimation process 410a with a predetermined level of accuracy.

Also illustrated in FIG. 4 is the process by which foreign language detector model 435 is validated. The validation process is similar to that of the training process, with testing audio dataset 440 being provided to word error rate estimation process 410b. It is noted that word error rate estimation process 410b may be the same word error rate estimation process as word error rate estimation process 410a. The outputs of word error rate estimation process 410b are provided to feature extraction function 420b (which may be the same feature extraction function as feature extraction function 420a). Testing audio dataset 440 is also provided to label extraction function 425a (which may be the same label extraction function as label extraction function 425b), the output of which is an indication of whether or not the language spoken in testing audio dataset 440 is the same language used by the automatic speech recognition engines contained within word error rate estimation process 410b.

The output of feature extraction function 420b is provided to model inference operation 445, while the output of label extraction function 425b is provided to model testing operation 450. Model inference operation 445 runs the output of feature extraction function 420b against foreign language detector model 435, which results in an indication of whether or not the language spoken in testing dataset 440 is the same language assumed by the automatic speech recognition engines contained in word error rate estimation process 410b. Model testing operation 450 then compares the determination from model inference operation 445 with the indication provided by label extraction function 425b, which results in model validation 460. If foreign language detector model 435 has been trained correctly, the determination made by model inference operation 445 should agree with the indication provided by label extraction function 425b. The model validation process of FIG. 4 may be repeated for a plurality of testing datasets 440 to determine whether or not foreign language detector model 435 provides accurate foreign language detection with a predetermined level of accuracy.

Figure 5:
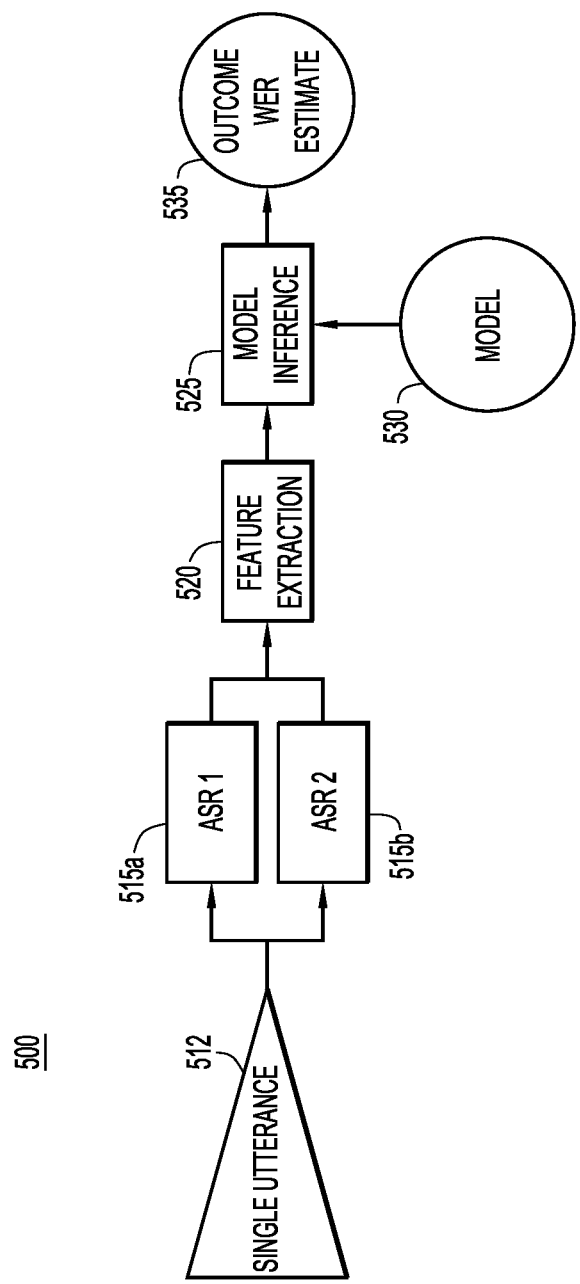
FIG. 5 is a process flow diagram depicting a process for generating word error rate estimates in an ensemble automatic speech recognition system using the word error rate estimation techniques of the present disclosure, according to an example embodiment.

Referring now to FIG. 5, depicted therein are operations of a word error rate estimation process flow 500, which may be analogous to the operations performed by word error rate estimation engine 114 of FIG. 3 and/or word error rate estimation processes 410a and 410b of FIG. 4. Word error rate estimation process flow 500 may provide for the functionality of a word error rate estimation engine as used in the foreign language detection techniques presented herein, but the use of word error rate estimation process flow 500 is not limited to foreign language detection use cases. Instead, word error rate estimation process flow 500 may be used in any application where it is desirable to generate a word error rate estimate for a transcript generated by an automatic speech recognition system.

In fact, there are numerous use cases outside of foreign language detection where the word error rate estimation techniques presented herein may be beneficial. For example, it is useful to be able to estimate the word error rate of a transcript provided by an automatic speech recognition engine in order to filter out any unusable transcripts and/or to signal to the end user the quality of the obtained transcript. The techniques of the present disclosure provide a way of assessing the word error rate of a transcript without also needing a ground truth (e.g., a human-generated transcript), independent of the foreign language detection techniques also presented herein. Implementing word error rate estimation techniques as described with reference to FIG. 5 may also significantly decrease the costs associated with human transcription, as only the transcripts flagged as low quality may be sent for correction as opposed to having a human transcription performed whenever a highly accurate transcript is desired.

The word error rate estimates provided by word error rate estimation process flow 500 may also be used to complement the confidence scores returned directly by automatic speech recognition systems. The confidence scores provided by automatic speech recognition systems are known to be inaccurate or inadequate. Therefore, the word error rate estimation techniques of the present disclosure may be provide a user with a better or more trustworthy indication of the accuracy of the output of an automatic speech recognition system. Furthermore, word error rate estimation model 530 of process flow 500 allows for the use of any kind of automatic speech recognition without regard to the implementation of the automatic speech recognition itself (i.e., word error rate estimation model 530 may be configured as a "black box" model) as long as the most probable transcripts from the automatic speech recognition engines 515a and 515b are available.

Word error rate estimation process flow 500 begins with audio data 512 being provided to multiple automatic speech recognition engines 515a and 515b. Audio data 512 may include speech audio signals that are streamed to a word error rate estimation engine that implements word error rate estimation process flow 500 (such as word error rate estimation engine 114 of FIG. 1 or word error rate estimation processes 410a and 410b of FIG. 4) or recorded prior to being provided to word error rate estimation process flow 500. Audio data 512 may be one of a plurality of audio datasets or data shards that have been separated out from a longer audio capture or recording, such as the audio associated with an online conference. More specifically, audio data 512 may be a single utterance (e.g., an audio shard separated out from a longer recording based on voice activity detection).

Audio data 512 is provided to a plurality of automatic speech recognition engines, automatic speech recognition engines 515a and 515b. More accurate word error rate estimates may be determined through the use of a plurality of automatic speech recognition engines, and these error rate estimates may be determined without resorting to resource and time intensive human transcriptions. While FIG. 5 illustrates two automatic speech recognition engines, other example embodiments of process flow 500 may utilized a larger number of automatic speech recognition engines.

The outputs of automatic speech recognition engines 515a and 515b may be transcripts of audio data 512, which are provided to feature extraction function 520. These outputs include a number of the most probable transcriptions from each of automatic speech recognition engines 515a and 515b, and at least one transcript is received from each of automatic speech recognition engines 515a and 515b. According to some example embodiments, each of automatic speech recognition engines 515a and 515b provides one transcript, with the output transcripts being the most probable transcript generated by each of automatic speech recognition engines 515a and 515b. According to other example embodiments, a first of automatic speech recognition engines 515a and 515b provides a different number of transcripts than provided by the other of the automatic speech recognition engines 515a and 515b. Providing a greater number of transcripts from each of automatic speech recognition engines 515a and 515b to feature extraction function 520 may result in more accurate word error rate estimates for audio data 512.

According to example embodiments, feature extraction function 520 determines features from the outputs of automatic speech recognition engines 515a and 515b that will serve as inputs to the word error rate estimation model 530. The extracted features may include features of the individual transcripts provided by automatic speech recognition engines 515a and 515b or features of the differences between the transcripts output by automatic speech recognition engines 515a and 515b. According to some specific example embodiments, two different sets of features may be generated by feature extraction function 520. A choice of one set of features is sufficient and a mix of both sets of features is possible. A first set of features may include word statistics, phoneme statistics and/or mutual word and character edit distances between the transcripts generated by automatic speech recognition engines 515a and 515b. This first set of features may result in a more accurate word error rate estimate for audio data 512, but utilizing this feature set may involve access to additional resources, such as language models and lexicons. Another set of features may include counts of insertions, counts of deletions, and counts of substitutions. These counts may be between same engine and cross-engine transcription outputs from automatic speech recognition engines 515a and 515b. Feature extraction function 520 may also extract combinations or subsets of the features in the above-described first and second sets of features.

The outputs of feature extraction function 520 are then provided to model inference operation 525, which applies the word error rate estimation model 530 to the extracted features. Specifically, model inference operation 525 transforms the extracted features into a format appropriate for use with word error rate estimation model 530. Model inference operation 525 then runs the extracted features against word error rate estimation model 530.

Finally, a word error rate estimate for audio data 512 is output as determination 535 from word error rate estimation model 530. This word error rate estimate is based on the transcript returned by an ensemble of all the speech recognition engines 515a and 515b. The word error rate estimate provided by word error rate estimation process flow 500 is an estimate of the true word error rate obtained by comparing the transcript from an ensemble of all the automatic speech recognition engines to the ground truth transcript (i.e., the transcript obtained using human labelers). Based on the word error rate estimate obtained, and depending on the use case in which word error rate estimation process flow 500 is implemented, a decision may be made on whether the transcript should be provided to a user, returned to the user that made the request, sent for human labelling, or even used for natural language processing as a further step.

Word error rate estimation process flow 500 may be particularly applicable to an online conference system use case. For example, the audio associated with an online conference system may be split into audio shards and then transcribed using multiple automatic speech recognition engines, which may result in an ensemble transcript for each shard. Word error rate estimation process flow 500 may then be used to estimate a word error rate for each audio shard transcript. There are several use cases for such an estimate, especially in terms of user experience improvements in online conferences.

As a first example, the word error rate estimates provided by word error rate estimation process flow 500 may be used to present a user (i.e., the reader of a transcript) with indications/demarcations of low accuracy portions of a transcript (e.g., different coloring may be used in transcript text to indicate shards with a high word error rate estimate). These indications/demarcations may serve as a guide so the user knows where to edit the transcript. Providing these indications/demarcations may also improve the user's perception of the performance of the automatic speech recognition system. Also, providing such indications/demarcations may allow users to take remedial action that will enable the automatic speech recognition system to provide the users with higher quality transcripts. Specifically, transcripts or individual shards with high word error rate estimates are often the result of poor audio input (e.g., low volume audio, high background noise audio, etc.), and they are not the result of a poor automatic speech recognition system. Providing users with indications/demarcations of low quality portions of transcripts may provide users with feedback that will allow the users to improve the audio they provide, which will improve the quality of the transcripts the users receive.

As a second example, the word error rate estimates provided by word error rate estimation process flow 500 may be used to prompt a user for permission to send the online conference recording out for human transcription to acquire more accurate transcripts. The word error rate estimates may also be used to select specific shards for human transcription, which may provide cost savings over sending entire transcripts for human transcription. The ability to identify individual shards with high word error rate estimates may be used to improve automatic speech recognition systems. Specifically, identifying specific shards with high word error rates helps in identifying specific types of audio that are challenging for automatic speech recognitions systems. Identification of such examples will allow future work to be directed to improving automatic speech recognition for these audio types. Furthermore, identifying the types of audio that are challenging to automatic speech recognition systems may help limit the portions of audio data that need to be transcribed by humans—only these challenging portions may be sent for human transcription, avoiding the cost of sending the entirety of the audio data for human transcription.

The word error rate estimates provided by word error rate estimation process flow 500 may also be used to identify portions of transcripts that should be hidden from users in order to improve users' overall perception of the transcript. The word error rate estimates provided by word error rate estimation process flow 500 may also be used to identify transcripts or portions of transcripts that should have their related audio data sent through a more computationally intensive automatic speech recognition engine to receive a transcript with higher accuracy.

Figure 6:
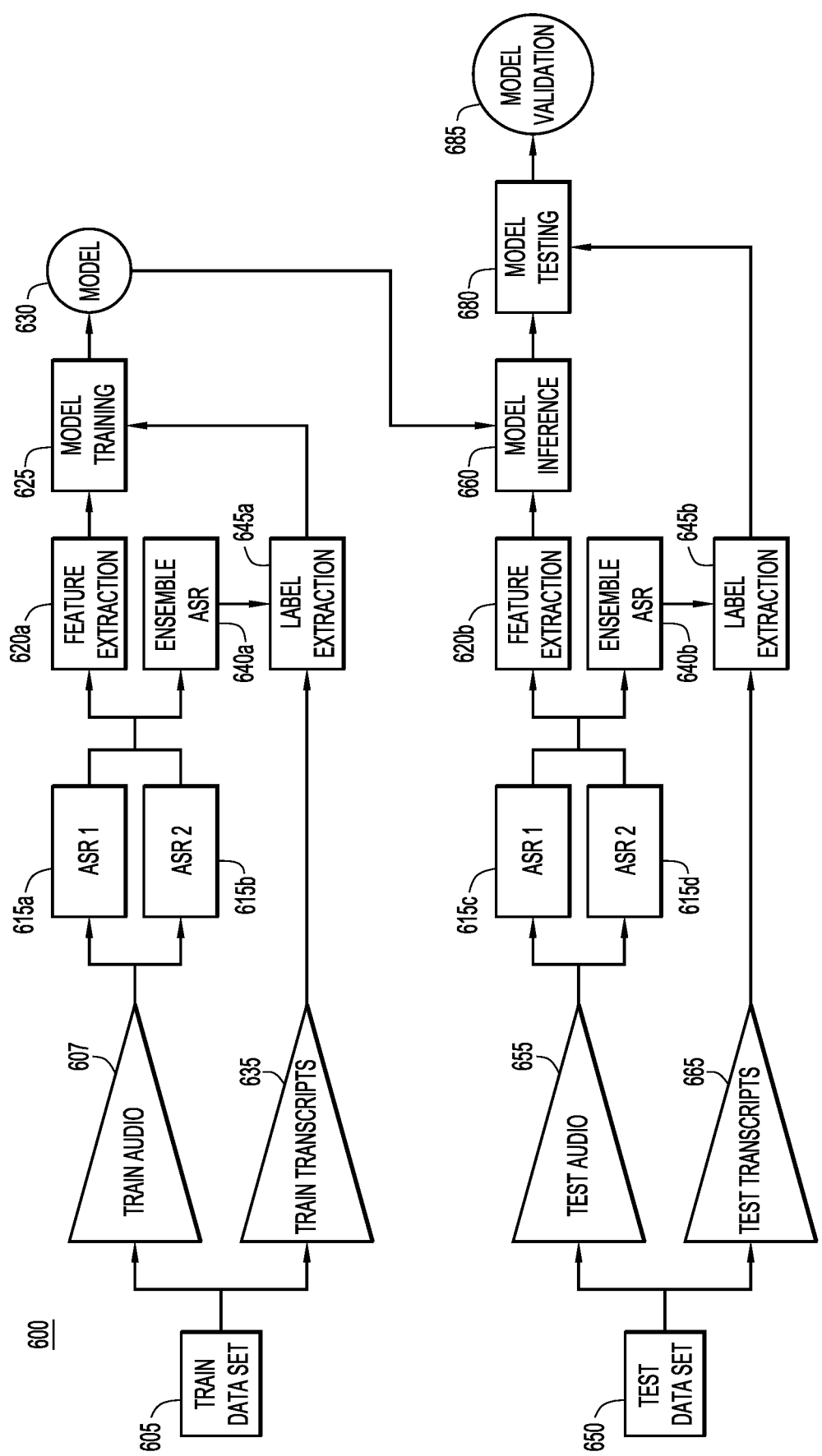
FIG. 6 is a process flow diagram depicting a process for training and validating a model for generating word error rate estimates in an ensemble automatic speech recognition system using the word error rate estimation techniques of the present disclosure, according to an example embodiment.

With reference now made to FIG. 6, depicted therein is word error rate training and validation process flow 600 that is used for training a word error rate estimation model, such as word error rate estimation model 530 of FIG. 5. Like the training of foreign language detector model 435 of FIG. 4, word error rate training and validation process flow 600 may be implemented according to supervised and unsupervised techniques.

Word error rate training and validation process flow 600 may be summarized as taking place in six overarching processes: 1. data collection, 2. automatic speech recognition, 3. feature extraction, 4. label extraction, 5. model training, and 6. Model testing.

During the data collection process, several thousand utterances along with human provided transcriptions are gathered. Accordingly to specific example embodiments, the utterances may be gathered from the same types of audio against which the word error rate estimation model is expected to be run. For example, if the word error rate estimation model is going to be used in an online conference system, the utterances may be gathered from online conferences. Online conference utterances may be used because these utterances may resemble the type of audio that would be encountered in a production online conference environment. For a model being trained for other use cases, other datasets may be used in the training process. The type of data used in the training process, and in particular how similar the training data is to the type of data to be found in the production environment, may have a significant effect on the quality of the estimates.

During the automatic speech recognition process, automatic speech recognition transcripts are generated using a plurality of automatic speech recognition engines. The automatic speech recognition process also includes generating a transcript using an ensemble automatic speech recognition engine that uses the transcripts provided by the other automatic speech recognition engines to produce higher quality transcripts.

During the feature extraction process, features are extracted from the transcripts provided by the plurality of automatic speech recognition engines. The extracted features may be the same features described above with reference to feature extraction function 520 of FIG. 5.

During the label extraction process, a word error rate for an ensemble automatic speech recognition transcript is computed using the available human provided transcripts.

During the model training process, the features (extracted during the feature extraction process) and the labels (extracted during the label extraction process) are used to train the word error rate estimation model. The techniques presented herein are applicable to several types of models including support vector machines, neural networks, and boosted tree models. A boosted tree model may be advantageous in the word error rate estimation techniques described herein. In practice, hundreds of experiments may be run to find the best combination of model parameters to produce the most accurate model, a process known as hyper-parameter tuning.

During the model testing process, the models trained in the model training process are applied to a test set that was held out from the original dataset (i.e., that was not used during the model training process) and the word error rate estimates are collected for the test dataset. These word error rates for the test dataset are compared directly to the output of the word error rate estimation model to the test datasets to verify the adequacy of the models.

Illustrated in FIG. 6 are the details of the above-described six-step process. Process flow 600 begins with the collection of the training dataset 605. Training dataset 605 may contain training audio data 607 and human-generated training transcripts 635 for this audio data. The training audio data 607 is provided to automatic speech recognition engines 615*a* and 615*b*, each of which produce one or more transcripts of training audio data 607. These transcripts are passed to feature extraction function 620*a*, which will extract the features analogous to those described above with reference to feature extraction function 520 of FIG. 5. These features are then passed to model training operation 625 for training of word error rate estimation model 630.

The transcripts generated from automatic speech recognition engines 615*a* and 615*b* are also passed to ensemble automatic speech recognition engine 640*a* in order to generate an ensemble transcript. This ensemble transcript generated by ensemble automatic speech recognition engine 640*a* and the human-generated training transcripts 635 are provided to label extraction function 645*a*. From these inputs, label extraction function 645*a* generates a word error rate for the ensemble transcript. The word error rate for the ensemble transcript is then provided to model training operation 625.

Model training operation 625 then uses the features extracted by feature extraction function 620*a* and the labels extracted by label extraction function 645*a* (i.e., the word error rate for the ensemble transcript) to train word error rate estimation model 630 to provide word error rate estimates for data similar in structure to training audio data 607.

To validate the training of word error rate estimation model 630, testing audio data 655 of test dataset 650 will be run against word error rate estimation model 630, and compared with the word error rate of an ensemble transcript generated using human-generated testing transcripts 665. This process begins with the test audio data 655 of test dataset 650 being provided to automatic speech recognition engines 615*c* and 615*d* (which may be the same automatic speech recognition engines as automatic speech recognition engines 615*a* and 615*b*, respectively). Automatic speech recognition engines 615*c* and 615*d* each produce one or more transcripts for testing audio data 655. These transcripts are passed to feature extraction function 620*b* (which may be the same feature extraction function as feature extraction function 620*a*). Feature extraction function 620*b* extracts features analogous to those described above with reference to feature extraction function 620*a* and feature extraction function 520 of FIG. 5. These features are then passed to model inference operation 660 for validation of word error rate estimation model 630. Model inference operation 660 runs word error rate estimation model 630 against the features provided by feature extraction function 620*b* and generates a word error rate estimate for the transcripts generated by automatic speech recognition engines 615*c* and 615*d*. Model inference operation 660 provides the word error rate estimate to model testing operation 680.

The transcripts generated from automatic speech recognition engines 615*c* and 615*d* are also passed to ensemble automatic speech recognition engine 640*b* (which may be the same ensemble automatic speech recognition engine as ensemble automatic speech recognition engine 640*a*) in order to generate an ensemble transcript. This ensemble transcript is passed to label extraction function 645*b* (which may be the same label extraction function as label extraction function 645*a*), as are human-generated testing transcripts

665. Label extraction function 645b generates a word error rate for the ensemble transcript using the human-generated testing transcripts 665. The word error rate for the ensemble transcript is provided to model testing operation 680.

Model testing operation 680 compares the word error rate estimate provided by model inference operation 660 to the word error rate for the ensemble automatic speech recognition engine 640b that was determined by label extraction function 645b. This comparison results in model validation determination 685. If word error rate estimation model 630 was correctly trained, the outputs of model inference operation 660 and label extraction function 645b should be in agreement. For example, if the word error rate estimate provided by word error rate estimation model 630 deviates from the word error rate provided by model inference operation 660 within a predetermined threshold, it may be determined that word error rate estimation model 630 has been trained to provide accurate word error rate estimates.

The model validation process of FIG. 6 may be repeated to determine whether or not word error rate estimation model 630 provides accurate word error rate estimates with a predetermined level of accuracy.

Figure 7:
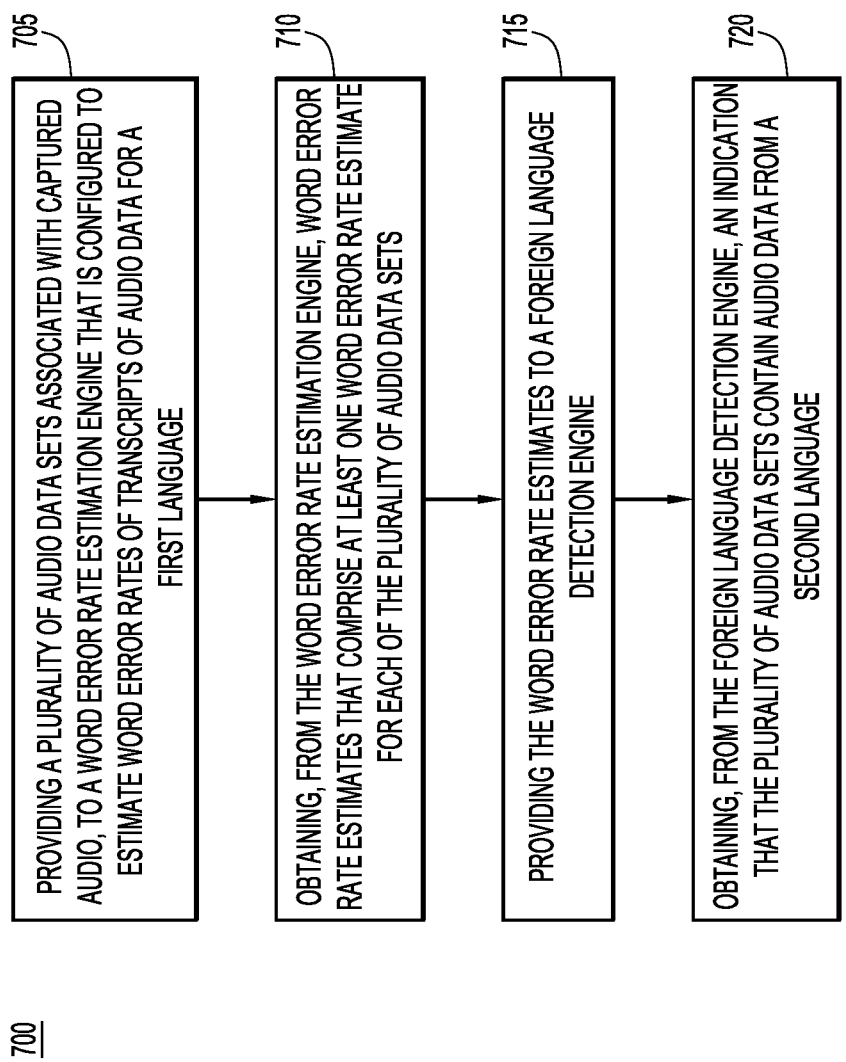
FIG. 7 is a flowchart illustrating a first generalized process flow for providing foreign language detection using the word error rate estimation techniques of the present disclosure, according to an example embodiment.

With reference now made to FIG. 7, depicted therein is a flowchart illustrating a generalized process flow 700 for the foreign language detection techniques presented herein. Process flow 700 begins in operation 705 where a plurality of audio datasets associated with captured audio are provide to a word error rate estimation engine. The word error rate estimation engine is configured to estimate word error rates of transcripts of audio for a first language. According to specific example embodiments, operation 705 may involve providing shards 312a-n to word error rate estimation engine 114 of FIG. 3.

In operation 710, word error rate estimates are obtained from the word error rate estimation engine. The word error rate estimates include at least one word error rate estimate for each of the plurality of audio datasets. According to specific example embodiments, operation 710 may involve obtaining word error rate estimates 318a-n as illustrated with reference to FIG. 3. Furthermore, obtaining of the word error rate estimates may include the operations described above with reference to FIG. 5.

In operation 715, the word error rate estimates are provided to a foreign language detection engine. Operation 715 may include the feature extraction operations of feature extraction function 320 and the providing of the features to model inference operation 325, both of FIG. 3.

Finally, in operation 720, an indication is obtained which indicates that the plurality of audio datasets contain audio from a second language. Operation 720 may be embodied as model inference operation 325 and the determination received via foreign language determination 335, both shown in FIG. 3.

Figure 8:
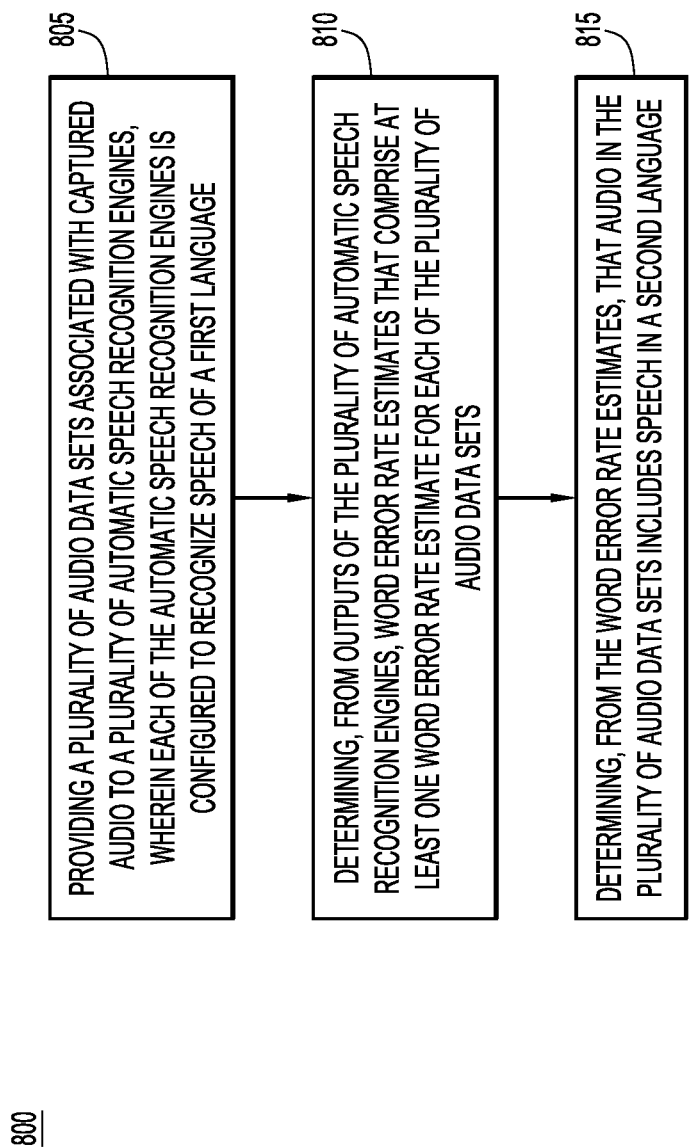
FIG. 8 is a flowchart illustrating a second generalized process flow for providing foreign language detection using the word error rate estimation techniques of the present disclosure, according to an example embodiment.

With reference now made to FIG. 8, depicted therein is a flowchart illustrating a second generalized process flow 800 for the foreign language detection techniques presented herein. The process flow 800 begins in operation 805 where a plurality of audio datasets are provided to a plurality of speech recognition engines. The plurality of audio datasets are associated with captured audio. Furthermore, each of the automatic speech recognition engines is configured to recognize speech of a first language. According to specific example embodiments, operation 805 may be involve providing shards 312a-n to word error rate estimation engine 114 of FIG. 3.

In operation 810, word error rate estimates are determined. According to operation 810, there is at least one word error rate estimate for each of the plurality of audio datasets. Furthermore, the word error rate estimates are determined from outputs of the automatic speech recognition engines. According to specific example embodiments, operation 810 may involve the determination of word error rate estimates 318a-n as illustrated with reference to FIG. 3. Operation 810 may also include operations as described with reference to FIG. 5, via which word error rate estimation process flow 500 generates word error rate estimates for audio data 512. For example, the operations described with reference to FIG. 5 may be applied to each of the plurality of audio datasets.

Finally, in operation 815 a determination is made, from the word error rate estimates, that the audio in the plurality of audio datasets includes speech in a second language. According to specific example embodiments, operation 815 may include operations as described above with reference to foreign language detection engine 116 of FIG. 3.

Figure 9:
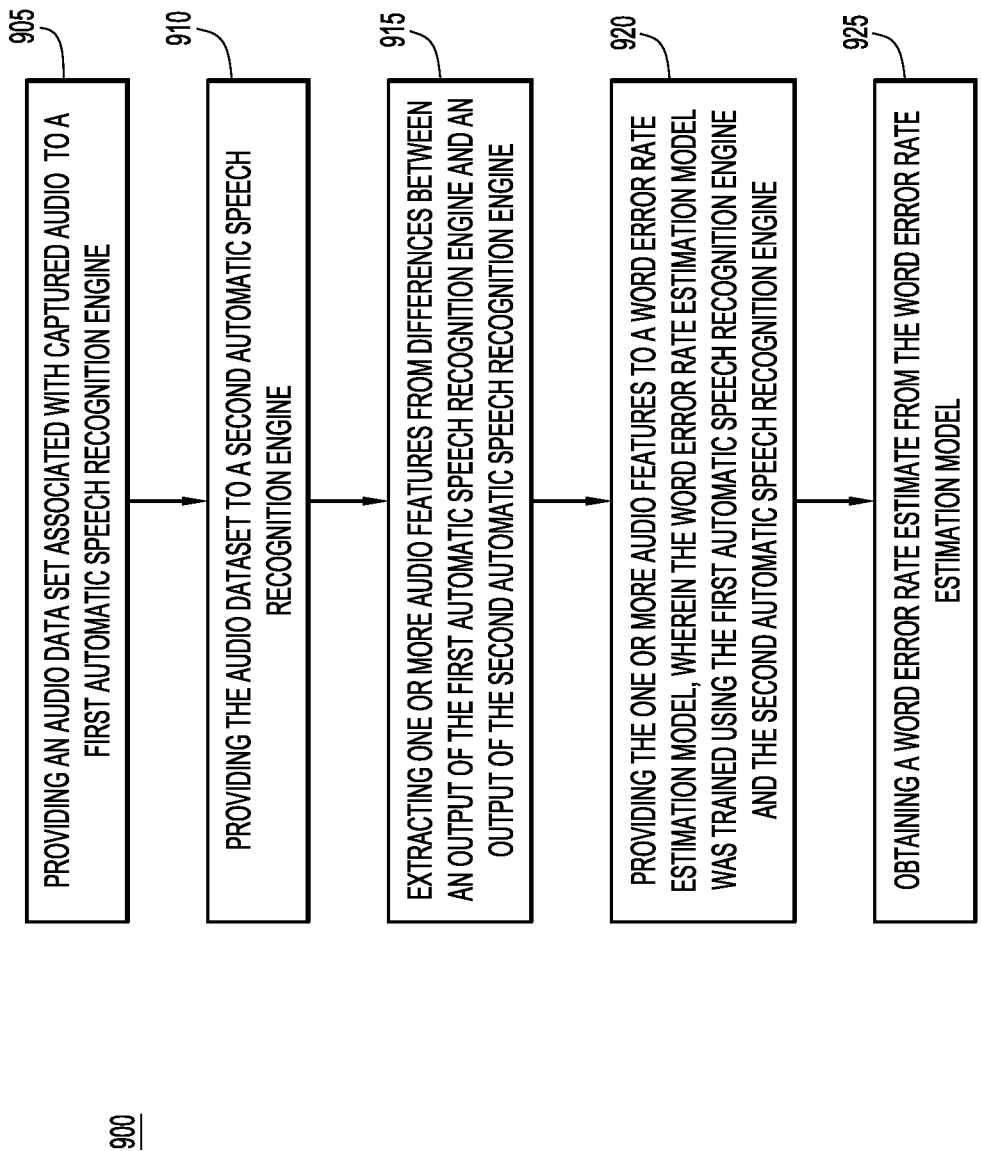
FIG. 9 is a flowchart illustrating a generalized process flow for providing word error rate estimates in an ensemble automatic speech recognition system using the word error rate estimation techniques of the present disclosure, according to an example embodiment.

Turning to FIG. 9, depicted therein is a flowchart illustrating a generalized process flow 900 for the word error rate estimation techniques presented herein. A process flow like that illustrated in FIG. 9 may be incorporated into a foreign language detection use case, like those described above with reference to FIGS. 1-3, 7 and 8. According to other example embodiments, a process flow like that illustrated in FIG. 9 may be applied to other use cases that do not relate to foreign language detection, but in which a word error rate estimate for an automatic speech recognition system is nevertheless desirable.

The process flow of FIG. 9 begins in operation 905 where an audio dataset associated with captured audio is provided to a first speech recognition engine, while in operation 910, the audio dataset is provided to a second automatic speech recognition engine. For example, operations 905 and 910 may involve providing audio data 512 to automatic speech recognition engines 515a and 515b, as illustrated in FIG. 5.

In operation 915, one or more audio features are extracted from differences between an output of the first automatic speech recognition engine and an output of the second speech recognition engine. Accordingly, operation 915 may involve feature extraction function 520 extracting features from the transcripts provided by automatic speech recognition engines 515a and 515b, as illustrated in FIG. 5.

In operation 920, the one or more audio features are provided to a word error rate estimation model. The word error rate estimation model of operation 920 may have been trained using the first automatic speech recognition engine and the second automatic speech recognition engine. For example, operation 920 may involve feature extraction function 520 providing extracted features to word error rate estimation model 530, as illustrated in FIG. 5.

Finally, in operation 925, a word error rate estimate is obtained from the word error rate estimation model. For example, operation 925 may involve word error rate estimation model 530 providing a word error rate estimate for audio data 512, as illustrated in FIG. 5.

In summary, example embodiments of the process flow of FIG. 9 may provide a word error rate estimator for an ensemble automatic speech recognition system that, in turn, makes use of transcriptions from multiple automatic speech recognition engines to predict the output word error rate of the automatic speech recognition engines. The word error rate estimates are obtained for shards of the audio recording data. When the word error rate estimates for a sufficiently large number of shards are collected, a machine learning trained statistical model may recognize patterns that emerge for different types of meetings. The word error rate estimation techniques of the present disclosure may also be applied to foreign language detection techniques, as embodied in the process flows of FIGS. 7 and 8. In particular, it may be possible to separate audio data into two different groups— one group may have speech in the language for which the automatic speech recognition engines are configured to detect, and the other group may have speech in a foreign language (i.e., languages for which the automatic speech recognition engines are not configured to detect).

Using the multiple shards for a particular audio dataset, it may be possible to approximate the word error rate of the full audio dataset to a high degree of accuracy as compared to the real word error rate obtained using human transcriptions. This accuracy may be far superior to that acquired for a transcription of a single shard. It may also be possible to determine which audio datasets are in a foreign language that was not the intended language for the automatic speech recognition system. This foreign language audio data may be distinguished from audio data that simply has been poorly transcribed, utilizing a machine learning trained statistical model.

The techniques presented herein may be used in conjunction with pre-transcription models to detect the language of a meeting without having to wait until the transcript is ready. The techniques of the present disclosure may also allow for a post-transcription judgement about the speech audio in case the audio data contains a foreign language that was missed by the pre-transcription models. This foreign language audio data may then be passed to the next best prediction of its language (based on the language detector models) and the process may be repeated with an automatic speech recognition engine designed for the foreign language.

Figure 10:
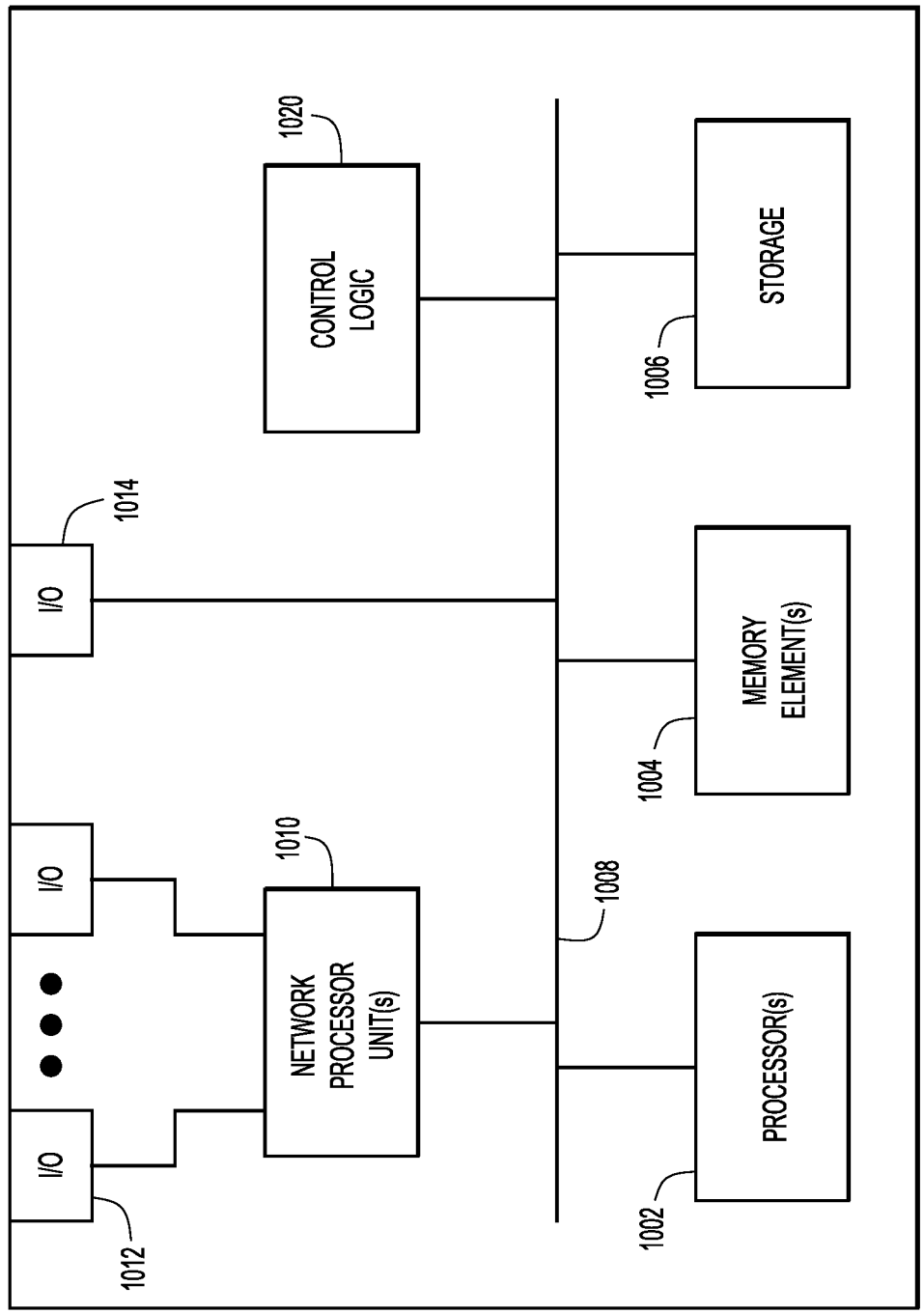
FIG. 10 is a functional block diagram of a device configured to implement the automatic speech recognition word error rate estimation techniques of the present disclosure, according to an example embodiment.

Referring to FIG. 10, FIG. 10 illustrates a hardware block diagram of a computing device 1000 that may perform functions associated with operations discussed herein in connection with the techniques depicted in FIGS. 1-9. In various embodiments, a computing device, such as computing device 1000 or any combination of computing devices 1000, may be configured for the techniques depicted in connection with FIGS. 1-9 in order to perform operations of the various techniques discussed herein.

In at least one embodiment, the computing device 1000 may include one or more processor(s) 1002, one or more memory element(s) 1004, storage 1006, a bus 1008, one or more network processor unit(s) 1010 interconnected with one or more network input/output (I/O) interface(s) 1012, one or more I/O interface(s) 1014, and control logic 1020. In various embodiments, instructions associated with logic for computing device 1000 can overlap in any manner and are not limited to the specific allocation of instructions and/or operations described herein.

In at least one embodiment, processor(s) 1002 is/are at least one hardware processor configured to execute various tasks, operations and/or functions for computing device 1000 as described herein according to software and/or instructions configured for computing device 1000. Processor(s) 1002 (e.g., a hardware processor) can execute any type of instructions associated with data to achieve the operations detailed herein. In one example, processor(s) 1002 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term "processor".

In at least one embodiment, memory element(s) 1004 and/or storage 1006 is/are configured to store data, information, software, and/or instructions associated with computing device 1000, and/or logic configured for memory element(s) 1004 and/or storage 1006. For example, any logic described herein (e.g., control logic 1020) can, in various embodiments, be stored for computing device 1000 using any combination of memory element(s) 1004 and/or storage 1006. Note that in some embodiments, storage 1006 can be consolidated with memory element(s) 1004 (or vice versa), or can overlap/exist in any other suitable manner.

In at least one embodiment, bus 1008 can be configured as an interface that enables one or more elements of computing device 1000 to communicate in order to exchange information and/or data. Bus 1008 can be implemented with any architecture designed for passing control, data and/or information between processors, memory elements/storage, peripheral devices, and/or any other hardware and/or software components that may be configured for computing device 1000. In at least one embodiment, bus 1008 may be implemented as a fast kernel-hosted interconnect, potentially using shared memory between processes (e.g., logic), which can enable efficient communication paths between the processes.

In various embodiments, network processor unit(s) 1010 may enable communication between computing device 1000 and other systems, entities, etc., via network I/O interface(s) 1012 (wired and/or wireless) to facilitate operations discussed for various embodiments described herein. In various embodiments, network processor unit(s) 1010 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 1000 and other systems, entities, etc. to facilitate operations for various embodiments described herein. In various embodiments, network I/O interface(s) 1012 can be configured as one or more Ethernet port(s), Fibre Channel ports, any other I/O port(s), and/or antenna(s)/antenna array(s) now known or hereafter developed. Thus, the network processor unit(s) 1010 and/or network I/O interface(s) 1012 may include suitable interfaces for receiving, transmitting, and/or otherwise communicating data and/or information in a network environment.

I/O interface(s) 1014 allow for input and output of data and/or information with other entities that may be connected to computer device 1000. For example, I/O interface(s) 1014 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1020 can include instructions that, when executed, cause processor(s) 1002 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1020) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. The memory element(s) 1004 may be read only memory (ROM), random access memory (RAM), magnetic disk storage media devices, optical storage media devices, flash memory devices, electrical, optical, or other physical/tangible memory storage devices. Thus, in general, the memory element(s) 1004 may comprise one or more tangible (non-transitory) computer readable storage media (e.g., a memory device) encoded with software comprising computer executable instructions and when the software is executed (by the processor(s) 1002) it is operable to perform the operations described herein. In particular, the computing device 1000 performs the operations described above in connection with FIGS. 1-5 when executing the software stored in memory element(s) 1004.

Any of the memory items discussed herein should be construed as being encompassed within the broad term "memory element". Data/information being tracked and/or sent to one or more entities as discussed herein could be provided in any database, table, register, list, cache, storage, and/or storage structure: all of which can be referenced at any suitable timeframe. Any such storage options may also be included within the broad term "memory element" as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1004 and/or storage 1006 can store data, software, code, instructions (e.g., processor instructions), logic, parameters, combinations thereof, and/or the like used for operations described herein. This includes memory element(s) 1004 and/or storage 1006 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IOT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as "messages", "messaging", "signaling", "data", "content", "objects", "requests", "queries", "responses", "replies", etc. which may be inclusive of packets. As referred to herein and in the claims, the term "packet" may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a "payload", "data payload", and variations thereof. In some embodiments, control or routing information, management information, or the like can be included in packet fields, such as within header(s) and/or trailer(s) of packets. IP addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase "at least one of", "one or more of", "and/or", variations thereof, or the like are open-ended expressions that are both conjunctive and disjunctive in operation for any and all possible combination of the associated listed items. For example, each of the expressions "at least one of X, Y and Z", "at least one of X, Y or Z", "one or more of X, Y and Z", "one or more of X, Y or Z" and "X, Y and/or Z" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms "first", "second", "third", etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, "first X" and "second X" are intended to designate two "X" elements that are not necessarily limited by any order, rank, importance, temporal sequence, or hierarchy of the two elements. Further as referred to herein, "at least one of" and "one or more of" can be represented using the "(s)" nomenclature (e.g., one or more element(s)).

Additionally, terms such as "transmit" and "receive" are broadly used herein to refer to techniques for providing and obtaining data in network environments. For example, data may be provided and obtained through packets transmitted and received through system 100 of FIG. 1. Data may also be provided and obtained through data communicated via out-of-band signaling or control channels used in system 100 of FIG. 1.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In summary, provided for herein are one or more methods. According to example embodiments, the methods include: providing a plurality of audio datasets associated with captured audio to a plurality of automatic speech recognition engines, wherein each of the automatic speech recognition engines is configured to recognize speech of a first language; determining, from outputs of the plurality of automatic speech recognition engines, word error rate estimates that include at least one word error rate estimate for each of the plurality of audio datasets; and determining, from the word error rate estimates, that audio in the plurality of audio datasets includes speech in a second language.

According to specific example embodiments of the methods, providing the plurality of audio datasets to the plurality of automatic speech recognition engines includes separating a single audio dataset from the captured audio into the plurality of audio datasets. Such example embodiments of the methods may also include separating the single audio dataset using voice activity detection. According to still other example embodiments of these methods, the single audio dataset includes an online conference session audio recording.

According to other example embodiments of the methods, determining that the audio in the plurality of audio datasets includes speech in the second language includes: extracting features from the word error rate estimates; and providing the features to a foreign language detector model. According to specific example embodiments of such methods, extracting the features may include extracting one or more of: a percentage of the word error rate estimates that are valid, a percentage of the word error rate estimates that deviate from a predetermined threshold value, a level of one or more moments around a mean value of the word error rate estimates, or duration and word count weighted means for the word error rate estimates.

Also provided for herein are methods that include: providing a plurality of audio datasets associated with captured audio to a word error rate estimation engine that is configured to estimate word error rates of transcripts of audio data for a first language; obtaining, from the word error rate estimation engine, word error rate estimates that include at least one word error rate estimate for each of the plurality of audio datasets; providing the word error rate estimates to a foreign language detection engine; and obtaining, from the foreign language detection engine, an indication that the plurality of audio datasets contain audio data from a second language. According to such methods, the word error rate estimation engine may include a plurality of automatic speech recognition engines. According to other example embodiments of such methods, each of the plurality of automatic speech recognition engines is configured to recognize speech of the first language.

According to other example embodiments of such methods, obtaining the word error rate estimates includes obtaining at least one word error rate estimate for each of the plurality of audio datasets from each of the plurality of automatic speech recognition engines. Also according to specific example embodiments of such methods, the foreign language detection engine includes a statistical model configured to detect foreign languages based upon the word error rate estimates. According to other specific example embodiments of the methods, providing the plurality of audio datasets to the plurality of automatic speech recognition engines includes separating a single audio dataset from the captured audio into the plurality of audio datasets. Such example embodiments of the methods may also include separating the single audio dataset using voice activity detection. According to still other example embodiments of the methods, the single audio dataset includes an online conference session audio recording.

Also provided for herein are apparatuses. The apparatus include one or more memories and one or more processors. The one or more memories store instructions configured to execute a word error rate estimation engine and instructions configured to execute a plurality of automatic speech recognition engines, wherein each of the automatic speech recognition engines is configured to recognize speech of a first language. The one or more processors are configured to: execute the instructions configured to execute the plurality of automatic speech recognition engines against a plurality of audio datasets associated with captured audio; determine at least one word error rate estimate for each of the plurality of audio datasets by executing the instructions configured to execute the word error rate estimation engine against outputs of the plurality of automatic speech recognition engines; and determine, from the word error rate estimates, that audio in the plurality of audio datasets includes speech in a second language.

According to specific example embodiments of the apparatuses, one or more processors are configured to separate a single audio dataset from captured audio into the plurality of audio datasets. Also according to such example embodiments, the one or more processors may be configured to separate the single audio dataset from the captured audio into the plurality of audio datasets using voice activity detection. According to other specific examples of the provided for apparatuses, the single audio dataset comprises an online conference session audio recording.

The one or more processors of the provided for apparatuses may also be configured to determine that the audio in the plurality of audio datasets includes speech in the second language by: extracting features from the word error rate estimates; and providing the features to a foreign language detector model. The one or more processors may also be configured to extract the features of the word error rate estimates by extracting one or more of the following: a percentage of the word error rate estimates that are valid, a percentage of the word error rate estimates that deviate from a predetermined threshold value, a level of one or more moments around a mean value of the word error rate estimates, or duration and word count weighted means for the word error rate estimates.

The techniques of the present disclosure also provide for one or more tangible, non-transitory computer readable mediums. The mediums may be encoded with instructions, which when executed by one or more processors, are operable to carry operations analogous to those described above with reference to the provided for methods and apparatuses.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    generating, from a plurality of audio datasets associated with captured audio via a plurality of automatic speech recognition engines, a plurality of outputs, wherein each of the plurality of automatic speech recognition engines is configured to recognize speech of a same first language;
    determining, via a word error estimation engine from the plurality of outputs of the plurality of automatic speech recognition engines, a plurality of word error rate estimates that comprise at least one word error rate estimate for each of the plurality of audio datasets of a word error rate in the same first language; and
    determining, from the plurality of word error rate estimates via a foreign language detection model, that audio in the plurality of audio datasets includes speech in a second language which differs from the first language that each of the plurality of automatic speech recognition engines is configured to recognize, wherein the foreign language detection model comprises one or more of a vector machine, a neural network or a boosted tree model trained to determine that an audio dataset language differs from an automatic speech recognition engine language based on word error rate estimates.

2. The method of claim 1, further comprising generating the plurality of audio datasets by separating a single audio dataset from the captured audio into the plurality of audio datasets.

3. The method of claim 2, wherein separating the single audio dataset from the captured audio into the plurality of audio datasets comprises separating the single audio dataset using voice activity detection.

4. The method of claim 1, wherein the captured audio comprises an online conference session audio recording.

5. The method of claim 1, wherein determining that the audio in the plurality of audio datasets includes speech in the second language comprises:

extracting features from the plurality of word error rate estimates; and providing the features to a foreign language detector model.

6. The method of claim 5, wherein extracting the features comprises extracting one or more of:
a percentage of the plurality of word error rate estimates that are valid,
a percentage of the plurality of word error rate estimates that deviate from a predetermined threshold value,
a level of one or more moments around a mean value of the plurality of word error rate estimates, or
duration and word count weighted means for the plurality of word error rate estimates.

7. A method comprising:
providing a plurality of audio datasets associated with captured audio to a word error rate estimation engine that is configured to estimate word error rates of transcripts of audio data for a same first language;
obtaining, from the word error rate estimation engine, a plurality of word error rate estimates that comprise at least one word error rate estimate for each of the plurality of audio datasets of a word error rate in the same first language;
providing the plurality of word error rate estimates to a foreign language detection model, wherein the foreign language detection model comprises one or more of a vector machine, a neural network or a boosted tree model trained to determine that an audio dataset language differs from an automatic speech recognition engine language based on word error rate estimates; and
obtaining, from the foreign language detection model, an indication that the plurality of audio datasets contain audio data from a second language which differs from the first language.

8. The method of claim 7, wherein the word error rate estimation engine comprises a plurality of automatic speech recognition engines.

9. The method of claim 8, wherein each of the plurality of automatic speech recognition engines is configured to recognize speech of the same first language.

10. The method of claim 8, wherein obtaining the plurality of word error rate estimates comprises obtaining at least one word error rate estimate from a transcript for each of the plurality of audio datasets generated from each of the plurality of automatic speech recognition engines.

11. The method of claim 7, wherein the foreign language detection model, comprises a statistical model configured to detect foreign languages based upon the plurality of word error rate estimates.

12. The method of claim 7, wherein providing the plurality of audio datasets associated with the captured audio comprises separating a single audio dataset from the captured audio into the plurality of audio datasets.

13. The method of claim 12, wherein separating the single audio dataset into the plurality of audio datasets comprises separating the single audio dataset using voice activity detection.

14. The method of claim 7, wherein the captured audio comprises an online conference session audio recording.

15. An apparatus comprising:
one or more memories storing instructions configured to execute a word error rate estimation engine and instructions configured to execute a plurality of automatic speech recognition engines, wherein each of the plurality of automatic speech recognition engines is configured to recognize speech of a same first language, and one or more processors configured to:
generate a plurality of outputs by executing the instructions configured to execute the plurality of automatic speech recognition engines against a plurality of audio datasets associated with captured audio;
determine a plurality of word error rate estimates by executing the instructions configured to execute the word error rate estimation engine against the plurality of outputs of the plurality of automatic speech recognition engines, wherein the plurality of word error rate estimates comprise at least one word error rate estimate for each of the plurality of audio datasets of a word error rate in the same first language; and
determine, from the plurality of word error rate estimates via a foreign language detection model, that audio in the plurality of audio datasets includes speech in a second language which differs from the first language that each of the plurality of automatic speech recognition engines is configured to recognize, wherein the foreign language detection model comprises one or more of a vector machine, a neural network or a boosted tree model trained to determine that an audio dataset language differs from an automatic speech recognition engine language based on word error rate estimates.

16. The apparatus of claim 15, wherein the one or more processors are configured to separate a single audio dataset from the captured audio into the plurality of audio datasets.

17. The apparatus of claim 16, wherein the one or more processors are configured to separate the single audio dataset from the captured audio into the plurality of audio datasets using voice activity detection.

18. The apparatus of claim 15, wherein the captured audio comprises an online conference session audio recording.

19. The apparatus of claim 15, wherein the one or more processors are configured to execute the instructions configured to execute the word error rate estimation engine against outputs of the plurality of automatic speech recognition engines, by:
extracting features from the plurality of word error rate estimates; and
providing the features to a foreign language detector model.

20. The apparatus of claim 19, wherein the one or more processors are configured to extract the features of the plurality of word error rate estimates by extracting one or more of the following:
a percentage of the plurality of word error rate estimates that are valid,
a percentage of the plurality of word error rate estimates that deviate from a predetermined threshold value,
a level of one or more moments around a mean value of the plurality of word error rate estimates, or
duration and word count weighted means for the plurality of word error rate estimates.

* * * * *